United States Patent [19]

Craig

[11] Patent Number: 4,971,292

[45] Date of Patent: Nov. 20, 1990

[54] HOIST APPARATUS

[75] Inventor: Richard L. Craig, Lisbon, Ohio

[73] Assignee: Craig Tool & Machine, Inc., Lisbon, Ohio

[21] Appl. No.: 397,675

[22] Filed: Aug. 23, 1989

[51] Int. Cl.[5] ............................................ B60P 1/10

[52] U.S. Cl. ............................................ 254/7 R

[58] Field of Search .................. 74/424.8 R; 254/7 R, 254/7 B, 7 C, 98, 100, 126; 187/8.47, 8.49, 8.50

[56] References Cited

U.S. PATENT DOCUMENTS

| | | | |
|---|---|---|---|
| 2,742,257 | 4/1956 | Hott et al. . | |
| 2,891,413 | 6/1959 | Millns . | |
| 2,895,712 | 7/1959 | Stovern et al. | 254/7 B |
| 2,910,883 | 11/1959 | Reed, Jr. . | |
| 2,915,913 | 12/1959 | Molyneux | 254/7 B |
| 3,962,737 | 6/1976 | James | 254/7 R |
| 4,076,216 | 2/1978 | Nussbaum . | |
| 4,593,883 | 6/1986 | Nelson . | |

*Primary Examiner*—Robert C. Watson
*Attorney, Agent, or Firm*—Michael Sand Co.

[57] ABSTRACT

A hoist apparatus for lifting a load includes an elongated, hollow tubular post formed with an elongated slot, and a T-shaped base for supporting the post in an upright position. The base has a plurality of lockable casters mounted thereon for portability of the hoist. A ball screw is rotatably suspended within the post and a follower nut is movably engaged with the ball screw for linear movement therealong, in response to manual rotation of the ball screw by a handwheel which is operatively connected thereto. A cylindrical-shaped carriage is engaged by the follower nut within the post for linear movement therewith along the ball screw. A plurality of crowned rollers are rotatably mounted adjacent to each of the ends of the carriage in a generally circular spaced arrangement, whereby each of the rollers rotatably arcuately contacts the curved interior surface of the tubular post for slideably engaging the carriage with the post for smooth movement of the carriage within the post. A stud is mounted on the carriage and extends transversely through and outwardly of the elongated slot of the post for retaining a lifted load thereon. A spring-biased safety detent is engageable with the handwheel in its normally biased position to prevent rotation of the handwheel and the ball screw, and corresponding movement of the carriage under the weight of a load, so that a locking clamp can be manually clamped to the post to lock the carriage, stud and the load carried thereon at a predetermined elevation.

14 Claims, 4 Drawing Sheets

HOIST APPARATUS

BACKGROUND OF THE INVENTION

1. Technical Field

The invention relates to hoist apparatus and in particular to a portable hoist apparatus adapted to support a load at various elevations. More particularly, the invention relates to such a portable hoist apparatus in which friction between moving mechanical parts of the apparatus is significantly reduced resulting in a smoothly operating hoist.

2. Background Information

In many manufacturing processes, it is necessary to support equipment, materials, etc., at various elevations adjacent to production lines for use in the manufacturing process. Further, certain equipment and/or materials often must be moved between various production lines.

For example, many manufacturing processes include the step of product labeling, wherein a product or its container is labeled by a label applicator. Such label applicators must be moved between various production lines, and positioned at different heights with respect thereto for proper application of the labels.

Various hoist apparatus and mounting stands are disclosed in the known prior art which could be utilized in the above-described manner. The closest known prior art to the present invention is shown and described in U.S. Pat. No. 4,593,883. However, the known prior art does not disclose a hoist apparatus which reduces friction against movement of a load-supporting carriage on a ball screw by rotatably suspending the ball screw within a tubular post, and/or mounting a plurality of crowned rollers in a generally circular arrangement on the carriage, so that the rollers conform to the shape of the tubular post resulting in a curved contact therebetween rather than a line or point contact.

Thus, the need exists for a hoist apparatus in which friction between moving mechanical parts thereof is significantly reduced, so that a load can be smoothly and efficiently moved to and supported at various elevations.

SUMMARY OF THE INVENTION

Objectives of the present invention include providing a hoist apparatus which smoothly and efficiently moves a load to various elevations free of excessive friction between the moving mechanical parts of the apparatus.

Another objective of the invention is to provide such a hoist apparatus which securely supports a load at various elevations.

A further objective of the invention is to provide such a hoist apparatus which can be safely and effectively operated by a single person, and which significantly reduces the possibility of injury to the operator and accidental damage to the supported load and associated equipment.

Still another objective of the invention is to provide such a hoist apparatus which is portable.

A still further objective of the invention is to provide such a hoist apparatus which is sturdy, stable, durable in use, easy to maintain, machined to close tolerances for easy and efficient use, and which is versatile for increasing the productivity of new and existing production lines.

Another objective of the invention is to provide such a hoist apparatus which is adaptable to manual or automatic operation.

These objectives and advantages are obtained by the hoist apparatus of the present invention of the type intended for lifting a load, the general nature of which may be stated as including, an elongated, hollow tubular post formed with an elongated slot; base means for supporting the post in an upright position; a ball screw rotatably mounted within the post; rotator means operatively connected to the ball screw for rotating the ball screw; follower means movably engaged with the ball screw for linear movement therealong in response to rotation of the ball screw by the rotator means; slide means engaged by the follower means within the post for linear movement therewith along the ball screw; a plurality of generally crowned rollers rotatably mounted on the slide means in a spaced relationship, wherein each of the rollers arcuately rotatably contacts an interior surface of the tubular post for slideably engaging the slide means with the post; holding means mounted on the slide means and extending outwardly through the elongated slot of the post for retaining a lifted load; and lock means for locking the slide means and the holding means at a predetermined elevation, so that upon rotation of the ball screw by the rotator means the load supported on the holding means is moved to the predetermined elevation by the follower means acting through the slide means, and is maintained in the predetermined position by the lock means.

BRIEF DESCRIPTION OF THE DRAWINGS

Preferred embodiments of the invention, illustrative of the best modes in which applicant has contemplated applying the principles, are set forth in the following description and are shown in the drawings and are particularly and pointed out and set forth in the appended claims.

Similar numerals refer to similar parts throughout the drawings.

DESCRIPTION OF THE PREFERRED EMBODIMENTS

Figure 1:
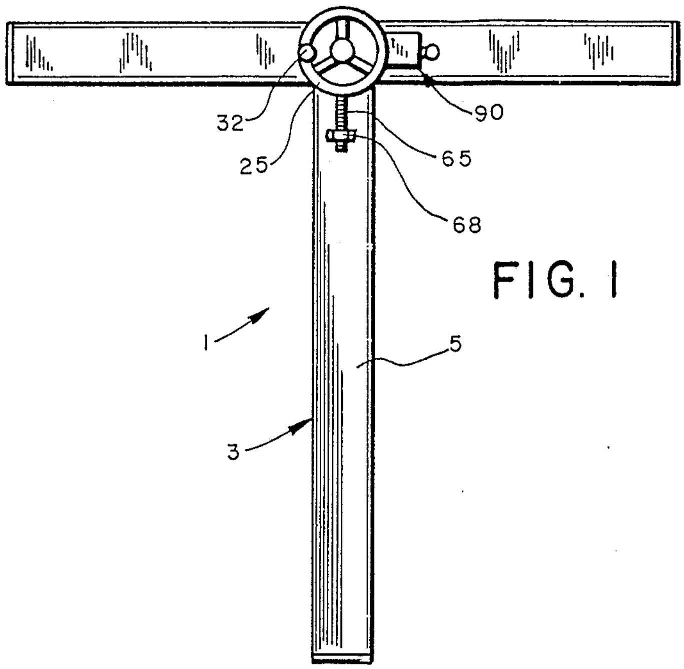
FIG. 1 is a top plan view of the improved hoist apparatus of the present invention.
Figure 2:
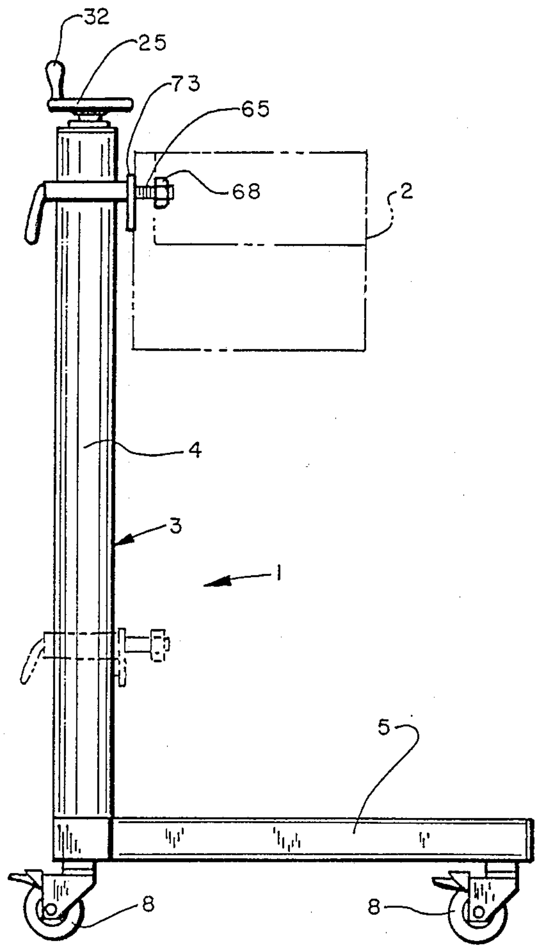
FIG. 2 is a side elevational view of the hoist apparatus of FIG. 1, illustrating the range of vertical travel of the load-supporting components of the apparatus.
Figure 3:
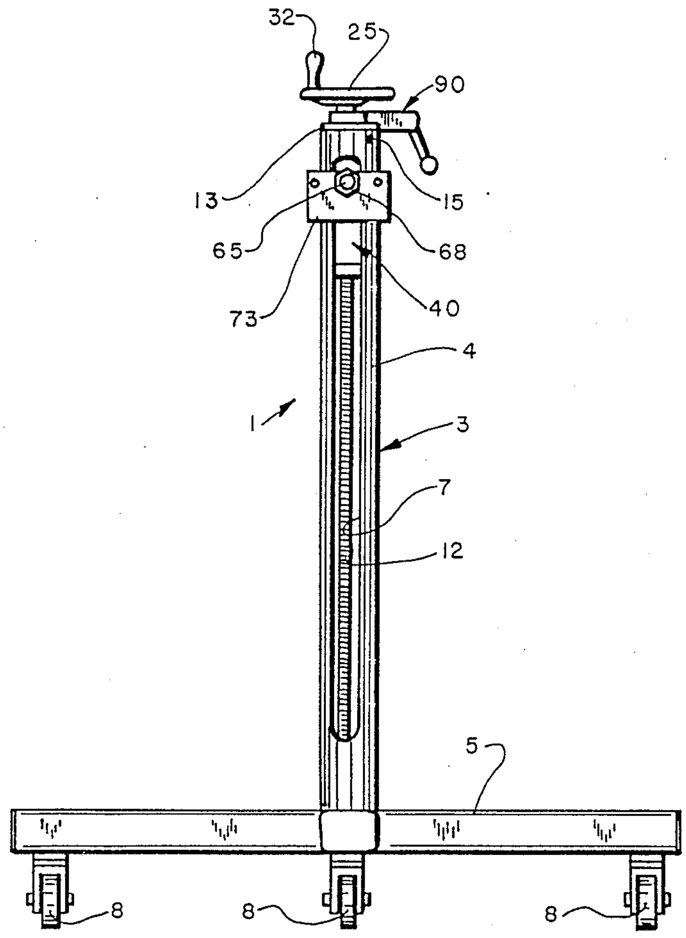
FIG. 3 is a front elevational view of the hoist apparatus of FIG. 1.

The improved hoist apparatus of the present invention is indicated generally at 1 and is shown in FIGS. 1–3. Hoist apparatus 1 in particular is shown in FIG. 2 in its intended use supporting a load 2 in an elevated position. Load 2 could be a piece of equipment such as a label applicator, a supply of material, etc., for use in a manufacturing process.

Figure 9:
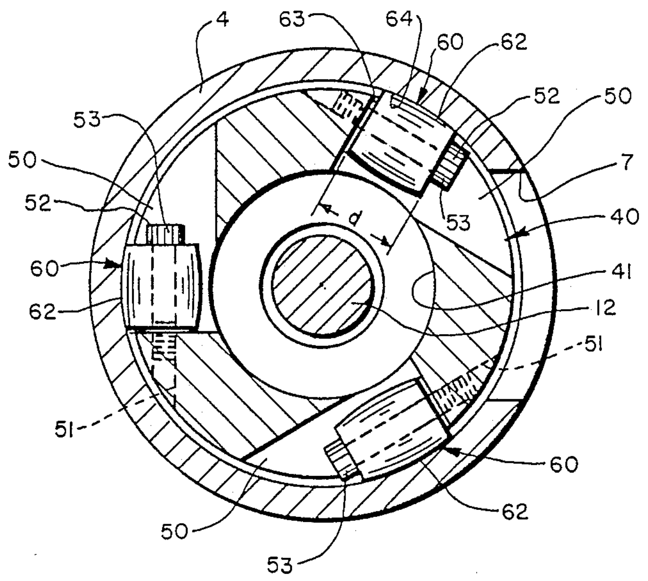
FIG. 9 is a sectional view taken on line 9—9, FIG. 7, particularly showing the arcuate contact between the rollers of the carriage and the tubular post.

Hoist apparatus I includes a support frame, indicated generally at 3 and shown in FIGS. 1–3, which comprises an elongated, hollow tubular post 4 attached by any suitable means such as welds to a T-shaped base 5 which supports post 4 in an upright position. Post 4 and base 5 preferably are formed of heavy gauge tubular steel for strength, stability and durability. Post 4 has a circular-shaped transverse cross-section, as best shown in FIG. 9, and is formed with an opening 6 in its upper end (FIG. 5) and an elongated, vertically-extending slot 7 in a front-facing portion thereof. A plurality of lockable casters 8 are mounted on the ends of T-shaped base 5 for portability of hoist 1 between production lines in a manufacturing plant. The casters ensure easy mobility of hoist 1 over rough surfaces.

Figure 5:
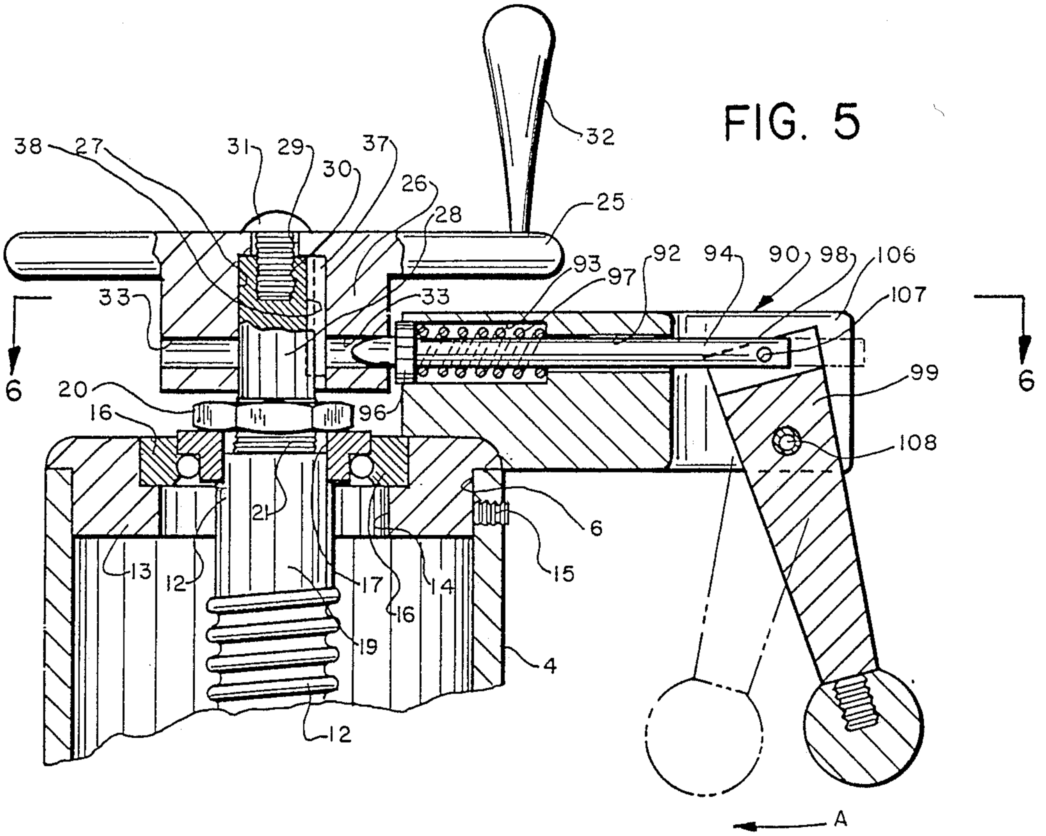
FIG. 5 is a greatly enlarged fragmentary front view, with portions broken away and in section, of the rotatably suspended ball screw, handwheel and detent device of the apparatus.
Figure 7:
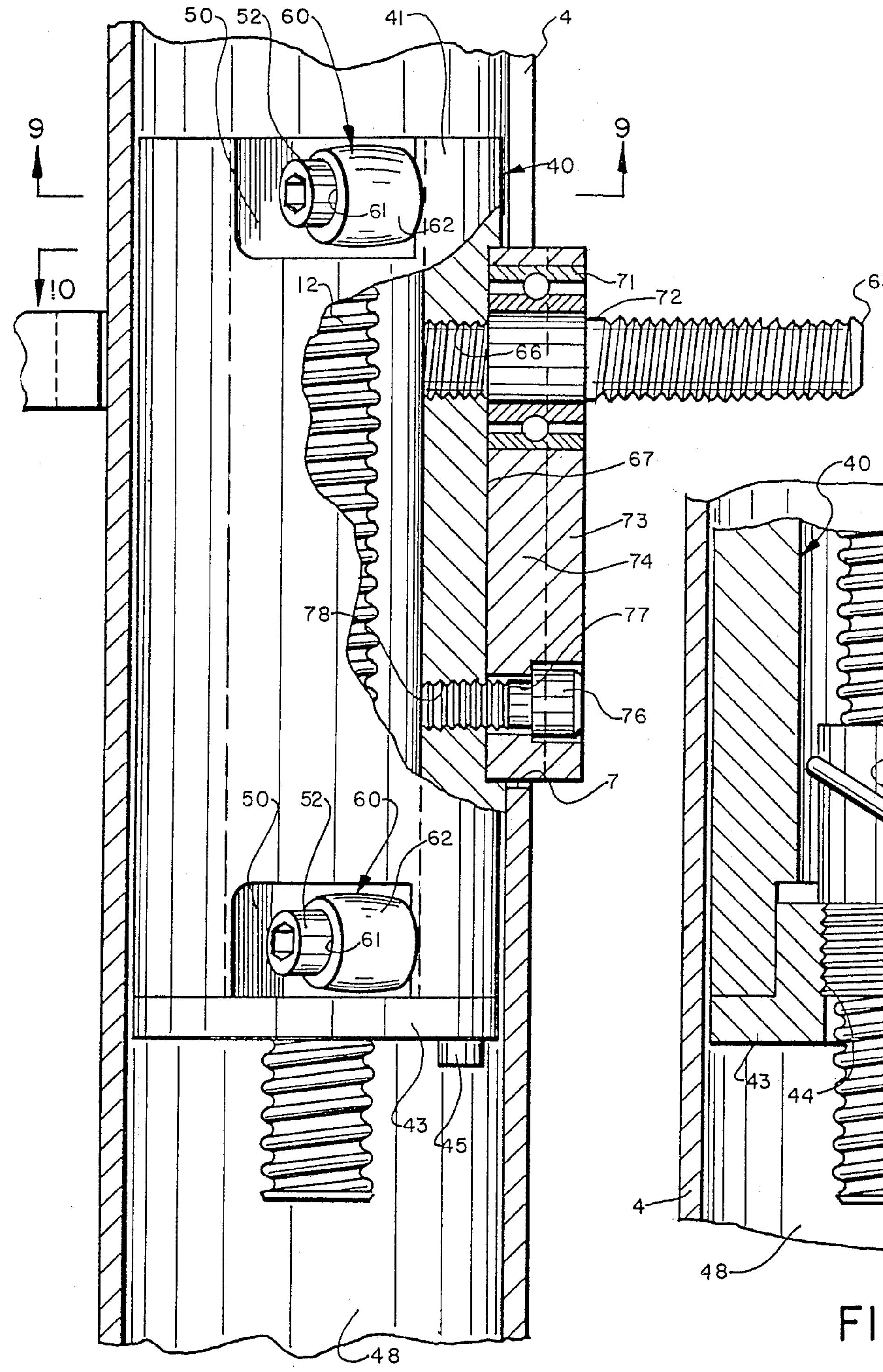
FIG. 7 is a greatly enlarged fragmentary side view, with portions broken away and in section, of the slide carriage mounted within the tubular post.

In accordance with one of the features of the present invention, a ball screw 12 of a type well-known in the art, is rotatably suspended within post 4 of frame 3 (FIGS. 3, 5 and 7). More specifically, a top cap 13 formed with a central stepped opening 14 therein, is mounted across opening 6 of post 4 by a set screw 15. A usual bearing 16 formed with an opening 17 is press fitted into stepped opening 14 of top cap 13. An unthreaded upper portion 19 of ball screw 12 is press fitted into opening 17 of bearing 16 to secure the ball screw in the bearing. A hex nut 20 is threadably engaged with a reduced-diameter threaded upper portion 21 of ball screw 12, and is tightened against bearing 16 to further secure the ball screw in the bearing.

Figure 8:
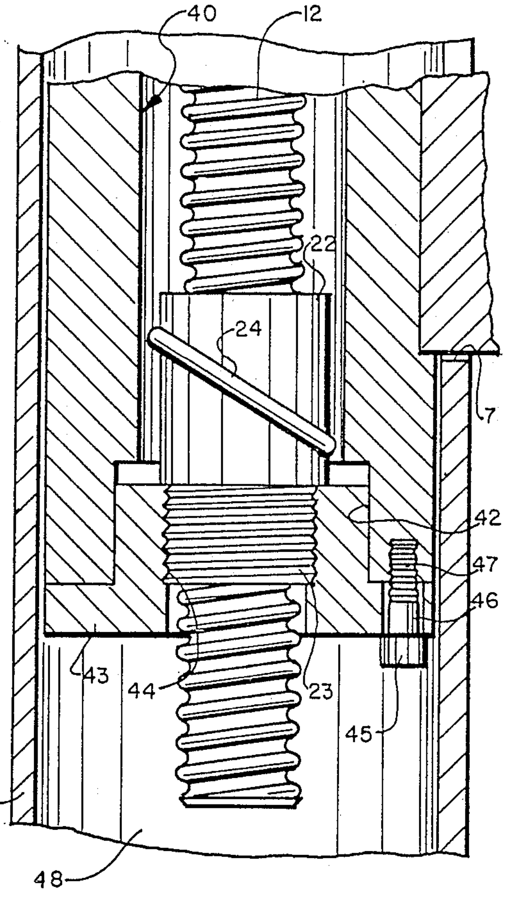
FIG. 8 is a greatly enlarged fragmentary side view, with portions broken away and in section, of the carriage mounted on a follower nut which in turn is mounted on the ball screw.

A usual follower nut 22 (FIG. 8) having a partially threaded outer surface 23, is movably mounted on ball screw 12 for linear movement therealong in response to rotation of the ball screw, as will be described in greater detail below in the description of the operation of hoist 1. Follower nut 22 has a race 24 formed therein which contains a plurality of bearings (not shown), to minimize the friction between the moving nut and rotating ball screw 12.

Figure 6:
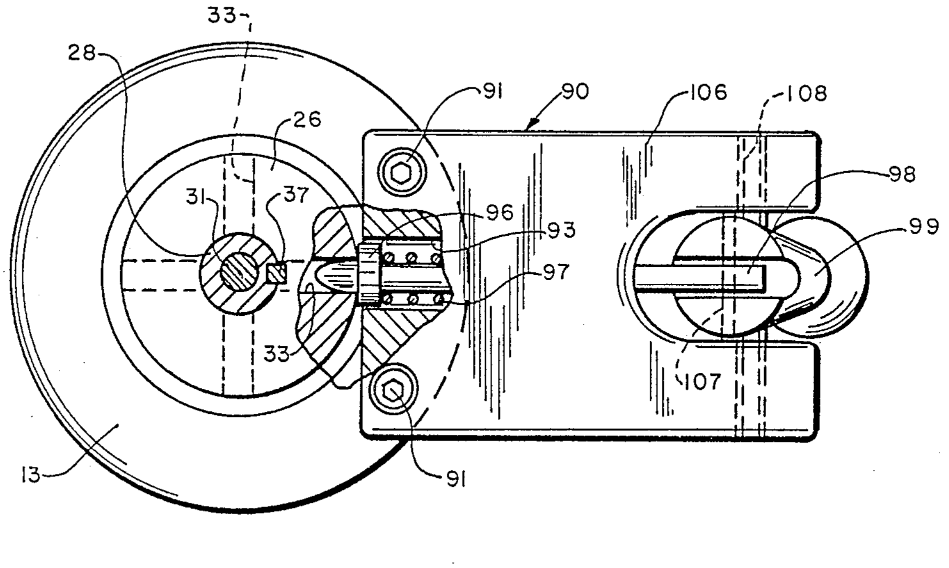
FIG. 6 is a sectional view, with portions broken away, taken on line 6—6, FIG. 5.

A handwheel 25 includes a hub 26 formed with a recess 27 and a key 37 which extends inwardly into the recess for receiving and engaging, respectively, a reduced-diameter unthreaded upper portion 28 of ball screw 12 formed with a complementary keyway 38 therein (FIGS. 5 and 6). An opening 29 is formed in hub 26 and is aligned with a threaded recess 30 formed in unthreaded upper portion 28 of ball screw 12. A bolt 31 passes through opening 29 of handwheel 25 and threadably engages aligned recess 30 of ball screw 12 for securing the handwheel on the ball screw. A knob 32 is formed integrally with handwheel 25 for easy manipulation and rotation of the handwheel. Four radially extending recesses 33 spaced 90° apart are formed in hub 26, with the purpose thereof being described below.

A slide carriage, indicated generally at 40 and best shown in FIG. 7, is mounted on follower nut 22 within hollow tubular post 4. More particularly, slide carriage 40 is generally cylindrical-shaped and is formed with a central bore 48 terminating in open top and bottom ends 41 and 42, respectively, for passage of ball screw 12 therethrough. Slide carriage 40 preferably is formed of aluminum. A bottom cap 43 (FIG. 8) formed with a central threaded opening 44 is mounted across open bottom end 42 of slide carriage 40, by a bolt 45 which passes through an opening 46 formed in bottom cap 43 and threadably engages an aligned threaded recess 47 formed in slide carriage 40. Carriage 40 thus is securely mounted on follower nut 22 by threadable engagement of threaded outer surface 23 of the follower nut with threaded opening 44 of bottom cap 43.

Three equally spaced shoulders 50 are formed in each of the top and bottom ends 41 and 42 of slide carriage 40 (FIGS. 7 and 9). A threaded lateral opening 51 is formed in slide carriage 40 adjacent to each shoulder 50 for threadably receiving a shoulder bolt 52 therein.

In accordance with another of the main features of the present invention, a crowned or curved roller, indicated generally at 60, is rotatably mounted on each shoulder bolt 52 (FIGS. 7 and 9). More specifically, each roller 60 is formed with a longitudinally extending opening 61 therethrough, into which a usual needle bearing (not shown) is press fitted, thereby enabling rollers 60 to rotate about shoulder bolts 52. As shown particularly in FIG. 9, the outside diameter of carriage 40 is slightly less than the inside diameter of post 4. Each set of three crowned rollers 60 of the top and bottom ends 41 and 42 of carriage 40 is mounted in a generally circular arrangement thereon, so that the rollers conform to the circular shape of tubular post 4 resulting in an arcuate or curved contact between each roller and the post rather than a line or a point contact. More particularly, an outermost curved portion 62 of each roller 60 of a set, always is coincidental with an imaginary circle which in turn generally is coincidental with an inside diameter or surface 64 of post 4. This curved contact of rollers 60 with post 4 is superior to a mere point or line contact, since the latter type of contact would cause increased friction between rollers 60 and post 4 and result in difficulty of movement of carriage 40 along ball screw 12. Moreover, a point or line contact of rollers 60 with post 4 could cause scoring of post 4 thus compounding the friction problem and resulting in further difficulty of operation of hoist 1.

The placement of a set of rollers 60 at the top and bottom ends 41 and 42 of carriage 40 (FIG. 7) provides for increased support and stability of carriage 40 and in turn ball screw 12, resulting in reduced friction and smoother operation of hoist 1. The suspension of ball screw 12 from the top end of post 4 also assists in reducing friction between the various moving mechanical parts of hoist apparatus 1. Also, it is important to note that the distance "d" (FIG. 9) between a head 53 of each shoulder bolt 52 and carriage 40 is greater than the length of roller 60, so that a slight clearance 63 is provided for side-to-side movement or "float" of the rollers which assists in preventing binding of the rollers during travel along post 4. Also, the placement of rollers 60 within post 4, in contrast to the presence of wheels, etc. on the outer surface of a post in many prior art hoist apparatus, eliminates a potential "pinch point" for injuring fingers, etc. of the operator of hoist 1.

A threaded stud 65 (FIGS. 1, 2, 7 and 10) is threadably engaged in a threaded opening 66 formed in a flat front portion 67 of carriage 40. Stud 65 extends transversely from carriage 40 outwardly through elongated slot 7 of post 4 for holding a load 2. A nut 68 threadably engages stud 65 to retain a load 2 thereon.

A usual cam follower bearing 71 (FIGS. 7 and 10) is slideably mounted on an unthreaded intermediate portion 72 of stud 65. A mounting backup plate 73 is formed with an opening 70 having a diameter generally complementary to the outside diameter of bearing 71, for slidable mounting of the backup plate on the bearing. Backup plate 73 is securely mounted on carriage 40 by passage of a bolt 76 through an opening 77 formed in backup plate 73, and into threadable engagement with an aligned threaded opening 78 formed in front flat portion 67 of carriage 40. A rearwardly extending portion 74 of backup plate 73 abuts flat front portion 67 of carriage 40. A pair of opposite lateral cutouts 75 are formed in rearwardly extending portion 74 of backup plate 73, so that bearing 71 protrudes slightly outwardly of the cutouts 75 and slideably engages post 4 along the longitudinal edges defining elongated slot 7. This engagement of bearing 71 with the longitudinal edges of slot 7 prevents turning of carriage 40 within post 4 and further stabilizes the carriage together with ball screw 12 and holding stud 65.

Figure 10:
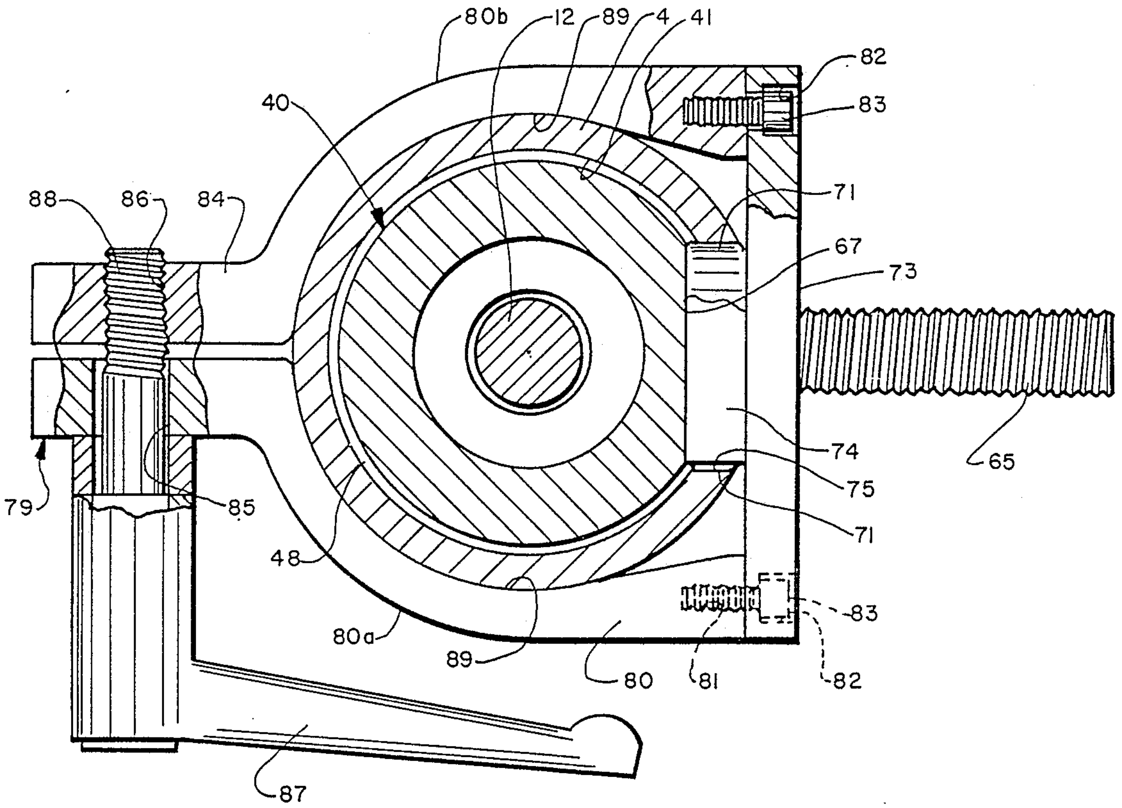
FIG. 10 is a sectional view, with portions broken away, taken on line 10—10, FIG. 7, particularly showing the carriage lock device.

A lock device, indicated generally at 79 and best shown in FIG. 10, serves as the primary device for locking carriage 40 and associated stud 65 at a predetermined elevation after movement of the carriage to the desired elevation. Lock device 79 includes a pair of opposed clamp members 80*a* and 80*b* each having a curved inner surface 89 and being formed with a threaded recess 81 in its frontward end. Threaded recesses 81 are aligned with a pair of spaced openings 82 formed in backup plate 73, and a bolt 83 is passed through each opening 82 and is threadably engaged with aligned recess 81 to mount clamp members 80*a* and 80*b* on backup plate 73. The rearward end of each curved clamp member 80 is formed with a rearwardly extending ear 84. Ear 84 of clamp member 80*a* is formed with an opening 85, and ear 84 of clamp member 80*b* is formed with a threaded opening 86. A manually-operated tightening handle 87 has a threaded rod 88 attached thereto. Threaded rod 88 is passed through opening 85 of clamp member 80*a* and threadably engages aligned threaded opening 86 of clamp member 80*b*. Handle 87 is rotated to tighten clamp members 80 against post 4 to effectively hold carriage 40 and a load retained on stud 65 at a predetermined elevation. It can be seen that absent locking of lock device 79, the weight of load 2 would cause follower nut 22 to move downwardly on and rotate ball screw 12, resulting in a drop of load 2 to the lowermost position of stud 65 illustrated in dot-dash lines in FIG. 2. It is important to note that curved inner surfaces 89 of clamp members 80 generally conform to the circular outer curvature of post 4, so that clamping of members 80 against the post will be secure and will not cause damage to the post.

A positive locking detent device, indicated generally at 90 and shown in FIGS. 5 and 6, is mounted on top cap 13 by a pair of screws 91. Detent device 90 serves as a safety or secondary locking device to primary lock device 79, by preventing rotation of handwheel 25 and in turn ball screw 12 under the weight of a load 2 being supported by hoist 1, until the operator of the hoist can tighten lock device 70. Detent device 90 includes a housing 106 having a longitudinally extending opening 92 formed therein which terminates in an increased diameter chamber 93. A pin 94 formed with a cone-shaped latching end 95 passes through opening 92 and chamber 93. Latching end 95 is cone-shaped for smooth insertion and removal from hub recesses 33 of handwheel 25. An increased diameter retaining member 96 is formed just inwardly of end 95 and holds a compression coil spring 97 placed about pin 94 within chamber 93. An opposite end 98 of pin 94 is pivotally attached to a lever 99 by a pin 107. Lever 99 in turn is pivotally attached to housing 106 by a pin 108 and is used to move latching end 95 of pin 94 against its normally biased position of engagement with a respective one of the handwheel hub recesses 33, by movement of the lever in the direction of arrow "A" as shown in dot-dash lines in FIG. 5.

Figure 4:
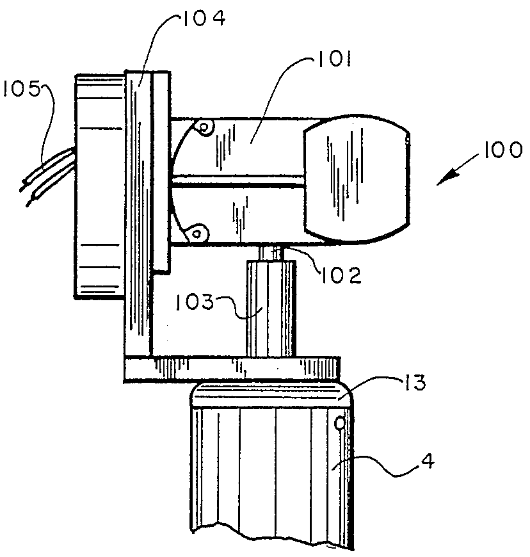
FIG. 4 is a fragmentary elevational view of a second embodiment of the hoist apparatus, showing an electric motor operatively connected to the ball screw for rotating the ball screw.

A second embodiment of the hoist apparatus of the present invention is indicated generally at 100 and is shown in FIG. 4. Hoist 100 is similar to hoist 1 in most respects, except that an electric motor 101 is used for automatically rotating ball screw 12, thus eliminating handwheel 25 and detent device 90 of hoist 1. An output shaft 102 of motor 101 is operatively connected to ball screw 12 by a coupler 103, and motor 101 is securely mounted on top cap 13 of post 4 by a bracket 104. Motor 101 is electrically connected to an energy source through electrical wires 105.

Improved hoist apparatus 1 of the present invention is operated in the following manner. A load 2 is placed on stud 65 and retained thereon by a nut 66 which tightens the load against backup plate 73, as shown in FIG. 2. Handle 87 of lock device 79, then is manually rotated to untighten rod 88 and release clamp members 80 from clamping engagement with post 4. Detent device 90, as described above, prevents the weight of load 2 from causing downward movement of follower nut 22 and carriage 40 on ball screw 12. Knob 32 of handwheel 25 then is securely grasped and resistance against its rotation is applied thereto as lever 99 of detent device 90 is moved inwardly in the direction of arrow "A", so that latching end 95 of pin 94 moves against its normally spring biased position and out of engagement with a respective one of the recesses 33 of hub 26 of handwheel 25. Handwheel 25 then is rotated in the appropriate direction until load 2 reaches a desired elevation, at which time lever 99 of detent device 90 is released.

More particularly, when handwheel 25 is rotated, ball screw 12 in turn is rotated causing follower nut 22 to move linearly upwardly or downwardly along the ball screw depending on the direction of rotation of the handwheel. Crowned rollers 60 of carriage 40 rotatably arcuately engage interior surface 64 of tubular post 4 so that the carriage smoothly slides within the post with a minimized amount of friction. The bearings movably mounted within follower nut 22 engage threaded ball screw 12 to ensure smooth, reduced-friction movement of the nut along the ball screw, and in turn smooth movement of carriage 40 along the ball screw. Rollers 60 also provide stability and support to the carriage 40 within post 4 and to rotatably suspended ball screw 12, which, due to its rotatable suspension, also reduces friction and provides for smooth, efficient movement of the carriage and a load supported thereon to a predetermined elevation. Bearing 71 also provides for smooth movement of backup plate 73 along slot 7 of post 4, and also assists in supporting and stabilizing carriage 40 and associated stud 65.

Once carriage 40 is moved to its desired elevation, since there are four equally spaced recesses formed in hub 26 of handwheel 25, the maximum possible rotation of handwheel 25 before latching end 95 of detent pin 94 engages one of the recesses 33 of hub 26, is one-quarter of a turn or 90°. This small maximum rotation translates into a negligible amount of vertical movement of carriage 40 on ball screw 12 subsequent to movement of the load to its desired height. Detent device 90 will temporarily and safely maintain load 2 at its desired elevation until locking device 79 can be clamped on post 4 to securely lock slide carriage 40, and its associated stud 65 and the load retained thereon, at the predetermined height. It can be seen that detent device 90 enables one person to effectively and safely operate hoist apparatus 1.

Again, one of the important features of the hoist apparatus of the invention is the plurality of circularly arranged, crowned rollers which are rotatably mounted adjacent to each of the top and bottom ends of the slide carriage, for rotating curved contact with the interior surface of the tubular post. This arrangement of the crowned rollers reduces friction, and results in smooth and efficient travel of the slide carriage within the post. Moreover, the rotatable suspension of the ball screw within the post also reduces friction in the travel of the carriage therealong.

Another important feature of the invention is the secondary or backup detent device which enables a single worker to move a load to a desired height on the apparatus, release the handwheel after positive locking of the detent therewith, and have free use of both hands to safely and securely tighten the primary lock device. Without the detent, a worker would have to maintain resistance against rotation of handwheel 25 with one hand, while locking carriage 40 in place with the other hand with the lock device 79, which is a difficult and potentially unsafe procedure, especially if the load carried thereon is very heavy.

In summary, the improved hoist apparatus smoothly and efficiently moves a load to various elevations without excessive friction between the moving mechanical parts of the apparatus, and securely and safely supports the load at a desired elevation. The hoist can be safely and effectively operated by a single person, and significantly reduces the chance of injury to the operator or damage to the supported load or associated production line equipment. The hoist is portable, sturdy, stable, durable, low maintenance, and versatile.

Accordingly, the hoist apparatus of the present invention is simplified, provides an effective, safe, inexpensive, and efficient apparatus which achieves all the enumerated objectives, provides for eliminating difficulties encountered with prior apparatus, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved hoist apparatus is constructed and used, the characteristics of the construction, and the advantageous, new and useful results obtained; the new and useful structures, devices, elements, arrangements, parts and combinations, are set forth in the appended claims.

I claim:

1. A hoist apparatus for lifting a load, including:

(a) an elongated, hollow tubular post formed with an elongated slot;

(b) base means for supporting the post in an upright position;

(c) a ball screw rotatably mounted within the post;

(d) rotator means operatively connected to the ball screw for rotating said ball screw;

(e) follower means movably engaged with the ball screw for linear movement therealong in response to rotation of said ball screw by the rotator means;

(f) slide means engaged by the follower means within the post for linear movement therewith along the ball screw;

(g) a plurality of generally crowned rollers rotatably mounted on the slide means in a spaced relationship, wherein each of the rollers arcuately rotatably contacts an interior surface of the tubular post for slideably engaging the slide means with the post;

(h) holding means mounted on the slide means and extending outwardly through the elongated slot of the post for retaining a lifted load; and (i) lock means for locking the slide means and the holding means at a predetermined elevation, so that upon rotation of the ball screw by the rotator means, the load supported on the holding means is moved to the predetermined elevation by the follower means acting through the slide means, and is maintained in said predetermined position by the lock means.

2. The apparatus defined in claim 1 in which the base means is a generally T-shaped member; and in which a plurality of lockable casters are mounted on the T-shaped member for portability of the hoist apparatus.

3. The apparatus defined in claim 1 in which the ball screw is rotatably suspended within the post.

4. The apparatus defined in claim 1 in which the rotator means is a handwheel.

5. The apparatus defined in claim 4 in which the handwheel includes a hub formed with a plurality of recesses; and in which a spring-biased detent is mounted adjacent to the handwheel and is engageable with the handwheel recesses in its normally biased position to prevent rotation of the handwheel and the ball screw when a load is carried on the holding means and the lock means is unlocked.

6. The apparatus defined in claim 1 in which the rotator means is a motor.

7. The apparatus defined in claim 1 in which the follower means is a nut having a plurality of bearings movably mounted therein.

8. The apparatus defined in claim 1 in which the slide means is a generally cylindrical-shaped carriage formed with a central bore terminating in a pair of opposite open ends for passage of the ball screw therethrough; in which the elongated, hollow tubular post has a generally circular-shaped transverse cross-section; and in which a plurality of the crowned rollers are mounted adjacent to each of the ends of the carriage in a generally circular arrangement, so that said rollers rotatably arcuately contact the interior surface of the post.

9. The apparatus defined in claim 8 in which three of the crowned rollers are mounted adjacent to each of the ends of the carriage in an equally spaced, generally circular arrangement; and in which the outermost crowned portion of each of the rollers mounted adjacent to a respective one of the ends of the carriage is coincidental with an imaginary circle which in turn is coincidental with the interior surface of the post.

10. The apparatus defined in claim 1 in which the holding means is a threaded stud which is threadably engaged with the slide means; and in which a nut is threadably engageable with the stud for retaining a load on said stud.

11. The apparatus defined in claim 1 in which the lock means is a manually-operated clamp which generally encircles and clampingly engages the tubular post, and is attached to the slide means for locking the slide means, the holding means and a load retained thereon at a predetermined elevation.

12. The apparatus defined in claim 1 in which a bearing is slideably mounted on the holding means and rotatably engages the elongated slot of the post for stabilizing and supporting the holding means and the slide means.

13. A hoist apparatus for lifting a load, including:

(a) an elongated, hollow tubular post generally circular-shaped in transverse cross-section and formed with an elongates slot;

(b) base means for supporting the post in an upright position;

(c) a ball screw rotatably suspended within the post;

(d) rotator means operatively connected to the ball screw for rotating said ball screw;

(e) follower means movably engaged with the ball screw for linear movement therealong in response to rotation of said ball screw by the rotator means;

(f) slide means slideably engaged with an interior surface of the tubular post and engaged by the follower means within the post, for linear movement therewith along the ball screw and the post, said slide means including a generally cylindrical-shaped carriage formed with a central bore terminating in a pair of opposite open ends for passage of the ball screw therethrough, and having a plurality of generally crowned rollers rotatably mounted on the slide means adjacent to each of the ends of the carriage in a generally circular spaced relationship, so that each of the rollers arcuately rotatably contacts the interior surface of the post for slideably engaging the carriage with the post;

(g) holding means mounted on the slide means and extending outwardly through the elongated slot of the post for retaining a lifted load; and (h) lock means for locking the slide means and the holding means at a predetermined elevation, so that upon rotation of the ball screw by the rotator means, the load supported on the holding means is moved to the predetermined elevation by the follower means acting through the slide means, and is maintained in said predetermined position by the lock means.

14. The apparatus defined in claim 13 in which three of the crowned rollers are mounted adjacent to each of the ends of the carriage in an equally spaced, generally circular arrangement; and in which the outermost crowned portion of each of the rollers mounted adjacent to a respective one of the ends of the carriage is coincidental with an imaginary circle which in turn is coincidental with the interior surface of the post.

* * * * *